No. 719,829. PATENTED FEB. 3, 1903.
E. MAYER.
FIRE HOSE COUPLING.
APPLICATION FILED JUNE 20, 1902.
NO MODEL.

Witnesses:
Chas. W. Cou.
Titus H. Irons.

Inventor:
Ernest Mayer,
by his Attorneys;
Howson & Howson

UNITED STATES PATENT OFFICE.

ERNEST MAYER, OF WESTCHESTER, PENNSYLVANIA.

FIRE-HOSE COUPLING.

SPECIFICATION forming part of Letters Patent No. 719,829, dated February 3, 1903.

Application filed June 20, 1902. Serial No. 112,509. (No model.)

*To all whom it may concern:*

Be it known that I, ERNEST MAYER, a citizen of the United States, and a resident of Westchester, Pennsylvania, have invented certain Improvements in Fire-Hose Couplings, of which the following is a specification.

My invention relates to couplings adapted more particularly for use with fire-hose pipes or structures of a similar character, although its use is not limited thereto.

The structure forming the subject of my invention consists of a special form of interlocking coupling which is provided with special means for preventing disengagement until such time as desired, thereby preventing the accidental opening of the coupling.

My invention is fully illustrated in the accompanying drawings, in which—

Figure 1:
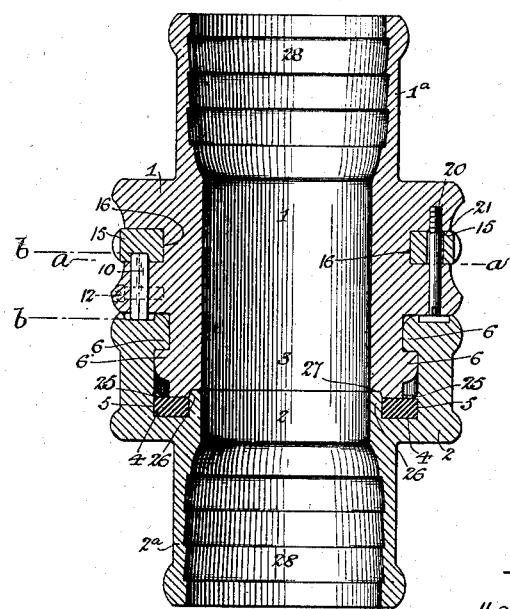
Figure 2:
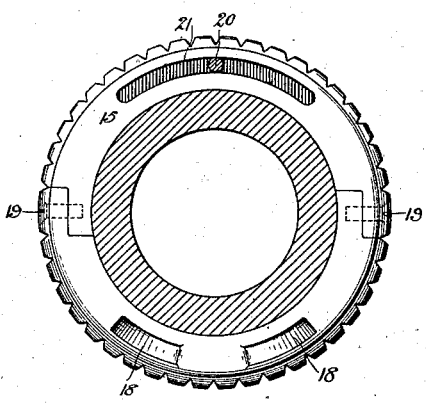
Figure 3:
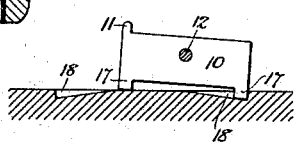
Figure 4:
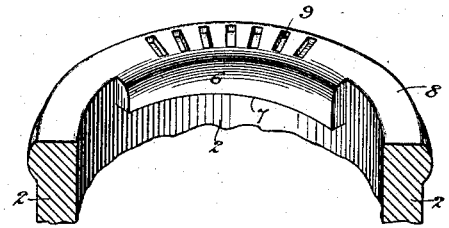

Figure 1 is a sectional elevation of my improved coupling. Fig. 2 is a sectional plan view taken on the line *a a*, Fig. 1. Fig. 3 is a sectional elevation taken on the line *b b*, Fig. 1; and Figs. 4, 5, and 6 are perspective views illustrating details of my invention.

In the accompanying drawings, 1 represents the male member of the coupling, and 2 the female member. The male member is provided with a projecting portion 3, which is seated against a gasket 4, made of some suitable resilient material, preferably rubber, such gasket being carried by the female member 2 and seated in a groove 5 formed therein. Each of the members 1 and 2 carry interlocking lugs 6, such lugs being beveled on their under sides 7, so that when the members are turned the faces of these lugs will be wedged against each other, and as the members are thereby forced together as one is turned with respect to the other the male member will seat against the gasket 4 and insure a water-tight joint.

For the purpose of locking the coupling members after they have been joined I provide the following means: The edge of the flange 8 of the female member is provided with a series of recesses 9, and carried by the male member is a locking-pawl 10, (clearly illustrated in Figs. 3 and 4,) having a projecting end 11 at the top adapted to seat itself in these recesses. This pawl is pivotally mounted in the coupling member 1, a screw 12 being provided for the purpose. To control the position of this locking-pawl, I provide a collar 15, adapted to a recess 16 in the male member, which collar has a partial rotative movement. At each end of the lower face of the pawl 10 lugs or projections 17 are provided, and cam-recesses 18 are formed in the collar 15 for the reception of these projections. By this means, as the said collar is turned so that its cam-surface will engage one of the lugs 17, the projection 11 at the upper part of the said pawl 10 will be seated in one of the recesses 9 of the female member 2, and when the collar 15 has reached the limit of its movement said pawl will be held in this locking position. The collar is preferably made in sections, as shown in Fig. 2, which sections are secured together by the screws 19, and to limit the movement of this collar the pin 20 is employed, which pin is carried by the male member 1 and is passed through the slot 21 formed in the collar.

Figure 5:
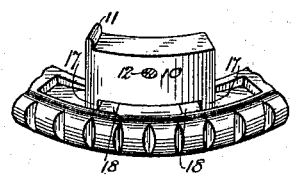
Figure 6:
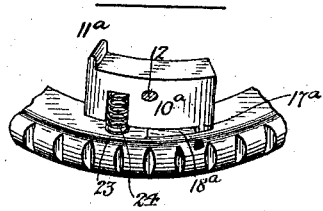

Instead of having the frictional engaging means, as illustrated in Figs. 3 and 5, I may provide a pawl $10^a$, as shown in Fig. 6, which pawl has a spring 23 to project the end $11^a$ of the pawl into one of the recesses 9, formed in the flange of the female member 2. The collar 15 in this instance is provided with a passage 24 for the reception of the spring, and a single cam-surface $18^a$, adapted to act on a single depending projection $17^a$ of the pawl $10^a$, so that the latter will be moved to cause its projection $11^a$ to engage one of the recesses 9 when it is desired to lock the sections of the coupling together. In this form of the locking device the members of the coupling may be turned in respect to each other to engage the lugs 6 after the collar 15 is set at the locking-point, as the pawl $10^a$ will yield and permit the movement of the female member, with its recesses 9, past the projection of said pawl. When this form of pawl is employed, the slot 21 in the collar 15 may be shortened, as indicated by dotted lines in Fig. 2.

The seat for the washer or gasket 4 is provided with the projecting flange 25 to hold said gasket in place, and also with beveled flange 26, which insures the proper seating of the projecting portion 3 of the male member 1. This beveled flange 26 enters a recess 27, formed in the end of the male member of the coupling, and by contact with the base of said recess limits the movement of the two members toward each other, and hence prevents the turning of one member with respect to the other to such an extent as to carry the lugs 6 out of engagement, and thus release the coupling.

Each of the coupling members 1 and 2 is provided with the projecting portions 1ª and 2ª, respectively, to receive the ends of the hose, (not shown,) and these members are preferably corrugated on the inner surface, as indicated at 28.

Having thus described my invention, I claim and desire to secure by Letters Patent—

1. The combination in a coupling of the character described, of the coupling members having interlocking and wedging means, a pivotally-mounted locking-pawl carried by one of said members and movable in the arc of a circle, the other of said members having recesses with which said locking-pawl engages, and means for controlling the position of said locking-pawl.

2. The combination in a coupling of the character described, of the coupling members having interlocking and wedging means, a pivotally-mounted locking-pawl carried by one of said members and movable in the arc of a circle, the other of said members having recesses with which said locking-pawl engages, and means carried by the pawl-holding member for controlling the position of said locking-pawl.

3. The combination in a coupling of the character described, of the coupling members having interlocking and wedging means, packing for making a water-tight joint between the means, a pivotally-mounted locking-pawl carried by one of said members and movable in the arc of a circle, the other of said members having recesses with which said locking-pawl engages, and means carried by said member for controlling the position of said locking-pawl.

4. The combination in a coupling of the character described, of the members having interlocking and wedging means, a pawl carried by one of said members, the other of said members having recesses for the engagement of said pawl, a movable collar carried by one end of said members and controlling the position of the pawl, said pawl having projecting portions to be acted upon by said collar, the latter being recessed for the purpose, and means for limiting the movement of said collar.

5. In a coupling of the character described, means for locking the coupling members together to prevent accidental loosening or uncoupling, said means comprising a pawl carried by one of the members, being pivoted thereto and having a portion adapted to enter recesses in the other member, a collar carried by one of said members, said collar having recessed portions coacting with projections on the pawl whereby the latter may be moved into and out of operative position by the movement of the collar, and means for limiting the movement of said collar.

6. A coupling having opposing members provided with wedging means whereby they are confined together, said members having a registering through-opening, one of said members having a recess and the other a flange entering the same, both of which elements are adjacent to said through-opening and so disposed that the seating of the flange in the recess will restrict movement of one member of the coupling in respect to the other and thereby prevent disengagement of the wedging means.

7. The combination in a coupling of the character described, of the coupling members having interlocking and wedging means, and a locking-pawl carried by one of said members and serving to prevent accidental disengagement of the coupling, said locking-pawl being pivotally mounted and adapted to rock in the arc of a circle and being wholly inclosed by the coupling and out of the way of accidental displacement.

In testimony whereof I have signed my name to this specification in the presence of two subscribing witnesses.

ERNEST MAYER.

Witnesses:
HARRY SMITH,
MURRAY C. BOYER.